Jan. 25, 1966

J. JONES ETAL 3,231,474

BOILING WATER NUCLEAR REACTOR AND METHOD OF OPERATING SAME

Filed June 19, 1963

Jan. 25, 1966   J. JONES ETAL   3,231,474
BOILING WATER NUCLEAR REACTOR AND METHOD OF OPERATING SAME
Filed June 19, 1963   4 Sheets-Sheet 4

# United States Patent Office 3,231,474
Patented Jan. 25, 1966

3,231,474
BOILING WATER NUCLEAR REACTOR AND
METHOD OF OPERATING SAME
Jack Jones, Manchester, and Ronald Scott Challender,
Appleton, Warrington, England, assignors to United
Kingdom Atomic Energy Authority, London, England
Filed June 19, 1963, Ser. No. 288,990
Claims priority, application Great Britain, July 16, 1962,
27,303/62
2 Claims. (Cl. 176—54)

This invention relates to nuclear reactors and is concerned with reactors of the type using a vaporisable coolant such as boiling water reactors.

As the occurrence of boiling in a reactor causes, in effect, loss of moderator where steam bubbles are formed the axial neutron flux pattern in a nuclear reactor is very distorted, being greatest at the bottom of the reactor. This distortion has the effect of reducing the power output. Also with a boiling water reactor the entry of low-temperature water to the core of the reactor can cause instabilities for it is known that two alternative flow patterns through the core could arise.

Accordingly, it is an object of the present invention to provide, in a reactor using a vaporisible coolant, such as a boiling water reactor, a control of reactor coolant so that the neutron flux is less distorted so that the power output is increased and the stability of the reactor is improved.

The invention consists in a nuclear reactor cooled by a vaporisible liquid coolant having means defining for the coolant two flow paths in series through the core of the reactor, which paths are in good heat transfer relationship with one another, the first flow path being from a first upper chamber downwards out of contact with the reactor fuel to a lower chamber, the coolant in that flow path starting at a temperature below saturation temperature and rising to be near saturation temperature and the second flow path being upwards in contact with the fuel, the coolant therein being at saturation temperature and discharging in a boiling condititon to a second upper chamber.

Four embodiments of the invention will now be described in detail with reference to the accompanying drawings in which.

Figure 1:
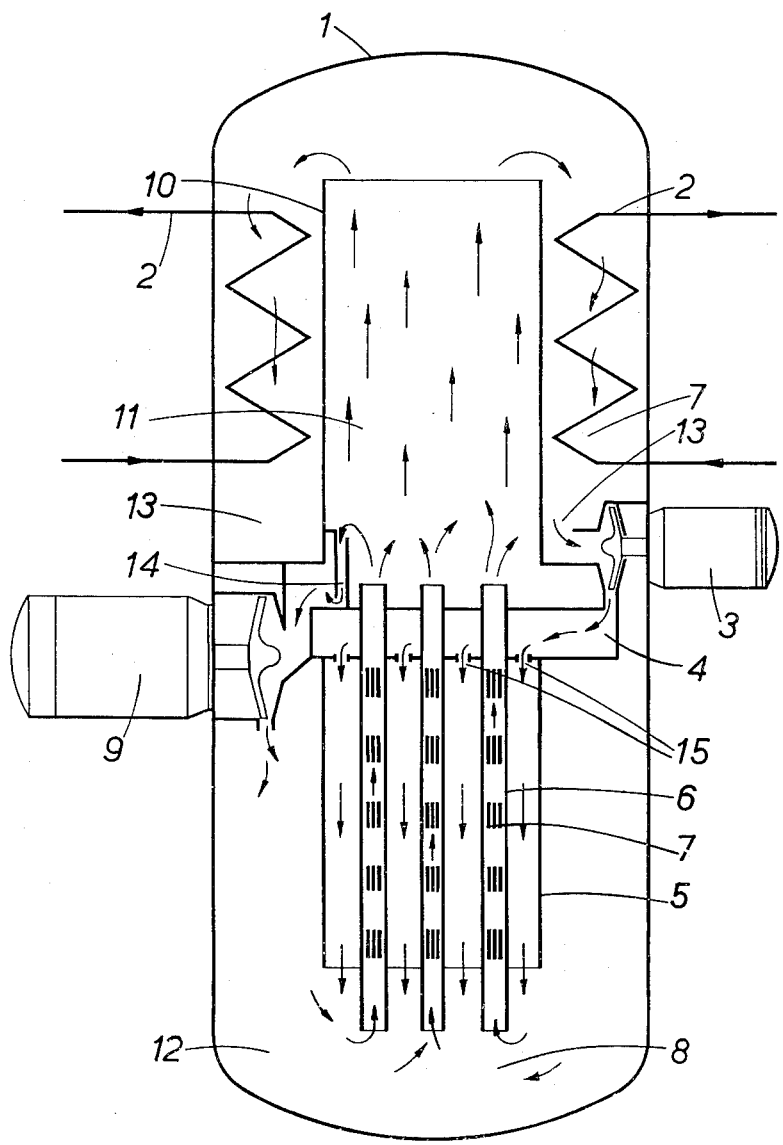
FIGURE 1 is a longitudinal sectional elevation of first embodiment.

Referring to FIGURE 1 there is shown a boiling water nuclear reactor comprising a pressure vessel 1 containing a core of fuel elements 7 situated in fuel channels 6, the channels 6 passing through a first upper chamber 4 and venting to a second upper chamber 11. Surrounding the fuel channels is a skirt 5 closed at its top end by the chamber 4 and open at the bottom end to a lower chamber 12. The bottom plate of the chamber 4 is pierced by holes 15 to allow water flow downwardly from the chamber 4, throughout the core of fuel elements 7, and in good heat transfer relationship with the channels 6. The channels 6 are made from thin section (0.030″) zirconium tube. They serve as barriers dividing the downward coolant flow through the core from the upward coolant flow. They do not have to withstand any significant pressure difference across their walls and it is required that they should not significantly impede heat transfer between the downward and upward flowing coolant. Upper baffles 10 are fitted to guide steam flow around and over a heat exchanger 2. At their lower end the baffles 10 forms a condensate compartment 13 and a condensate return pump 3 has its outlet connected to the chamber 4 to set up forced circulation of the coolant water. Water emerging from the fuel channels 6 is taken by a re-circulation pump 9 having its outlet open to the chamber 12. Water and steam separation takes place in a lower steam baffle 14 before the inlet to the pump 9.

In operation water in the fuel channels 6 is heated by the fission process heat in the fuel and rises by forced and natural convection to the top of the channel at which point part of the water has been heated sufficiently to form steam (typically at 546° F. which corresponds to an operating pressure of 1000 p.s.i.) which rises to chamber 11. The steam flow passes around the upper baffles 10 and over the heat exchanger 2 where it gives up its latent heat and some sensible heat and condenses into liquid at the compartment 13. This condensate is circulated by the condensate return pump 3 into the chamber 4 from which it is constrained to pass through the openings 15 and thence around the fuel channels 6. The flow rate is adjusted against temperature measurements so that the sub-cooled condensate from the chamber 4 is heated, principally by conduction through the channel walls 6, so that it is near saturation temperature by the time it arrives at the bottom of the channels 6 in the region 8. Typically the temperature will be 538° F.

Any water remaining unconverted to steam at the top of fuel channel 6 is recirculated past the steam baffles 14 to the lower chamber 12 by the re-circulating pump 9. This water is also near or at saturation temperature so on mixing with the circulated condensate the resultant stream in the region 8 is also near or at saturation temperature prior to entry to the channels 6. The relative flow through pumps 3 and 9 can be regulated by speed control of the pumps. This regulation can be effected manually or automatically against a temperature measurement taken at inlet to the channels 6.

Figure 2:
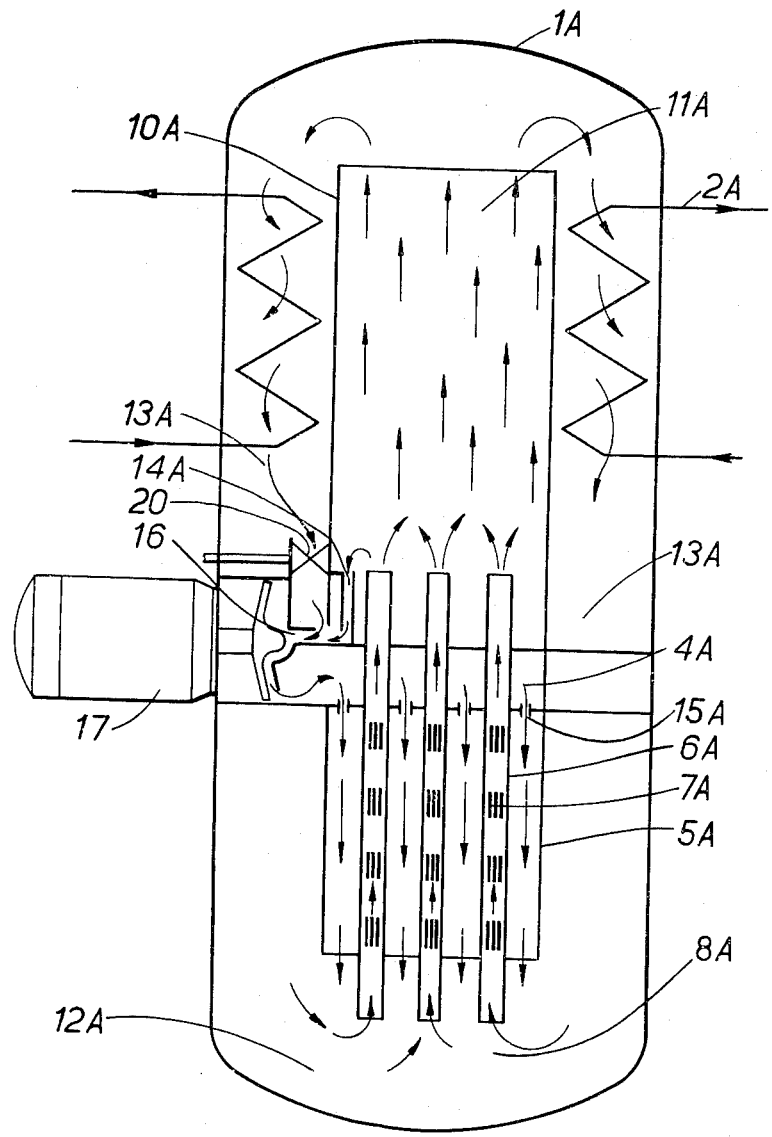
FIGURE 2 is a longitudinal sectional elevation of second embodiment.

FIGURE 2 shows a second embodiment of the invention. Parts of the reactor which are similar in shape, position and function to the corresponding parts of the reactor described with reference to FIGURE 1 are similarly numbered and suffixed A. Such parts will not again be described in detail.

Referring to FIGURE 2 a single pump 17 replaces pumps 3 and 9 of FIGURE 1. The pump 17 has two feeds joining together at channel 16. One feed is water separated from steam, the other feed is water from condensate chamber 13A. The outlet of the pump 17 is connected with the first upper chamber 4A.

In operation the pump 17 draws in both a sub-cooled condensate stream via channel 16 and a water stream at about saturation temperature past the baffle 14A. The resulting mixed stream is ejected into the upper chamber 4A and then flows downwards in contact with fuel channels 6A to gain heat as described in relation to FIGURE 1. As there is only a single pump the relative flows of sub-cooled condensate and recirculation water is regulated by a valve 20 between the condensate chamber 13A and channel 16.

Figure 3:
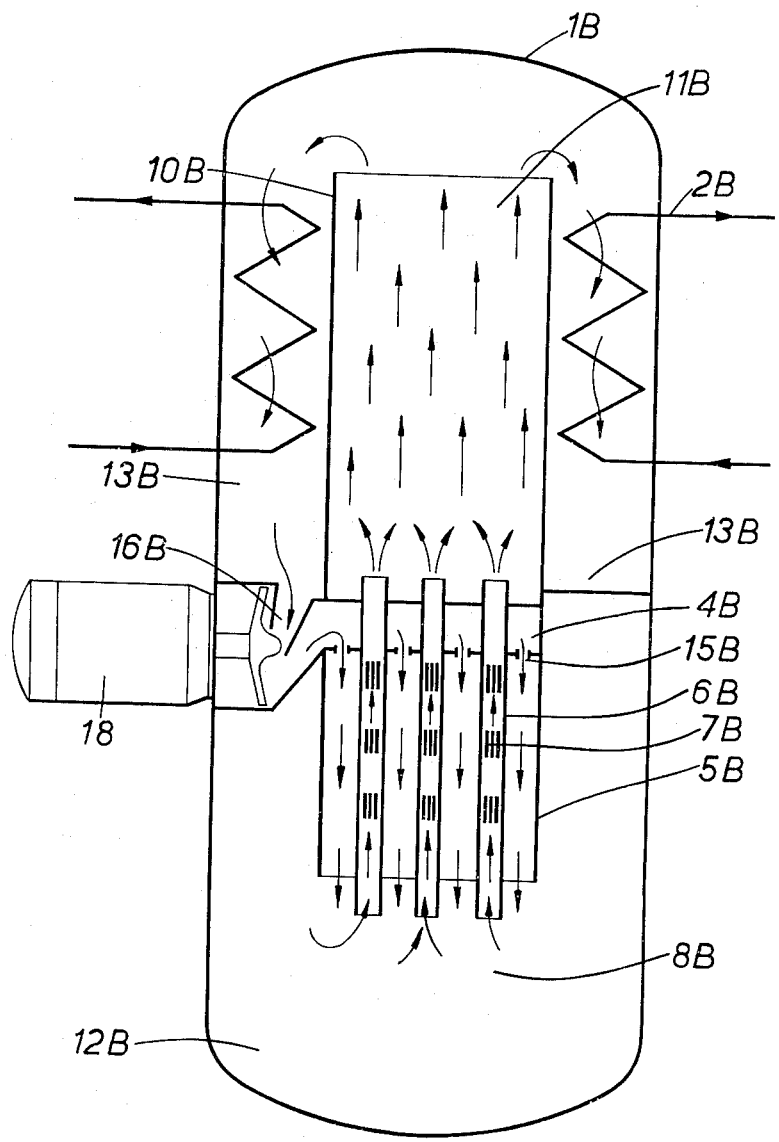
FIGURE 3 is a longitudinal sectional elevation of third embodiment.

FIGURE 3 shows a third embodiment of the invention. Parts of the reactor which are similar in shape, position and function to the corresponding parts of the recator described with reference to FIGURE 1 are similarly numbered and suffixed B. Such parts will not again be described in detail.

Referring to FIGURE 3 a single pump 18 is used with inlet connected by channel 16B to the condensate container 13B and outlet to the chamber 4B.

In operation water in the fuel channels 6 is heated by the fission process heat in the fuel and rises by forced and natural convection to the top of the channel by which point part of the water has been heated sufficiently to form steam which rises to chamber 11B. The steam and water flow passes around the upper baffles 10B and over the heat exchanger 2B where it givs up its latent heat and some sensible heat to condense it into liquid at 13B. This condensate is circulated by the condensate pump 18 into the upper chamber 4B from which it is constrained to pass through the openings 15B down around the fuel channels 6B. The flow rate is so adjusted that the sub-cooled condensate from the chamber 4B is heated by conduction through the channel walls 6B so that it is near or at saturation temperature by the time it arrives at the bottom of the channels 6B in the region 8B.

Figure 4:
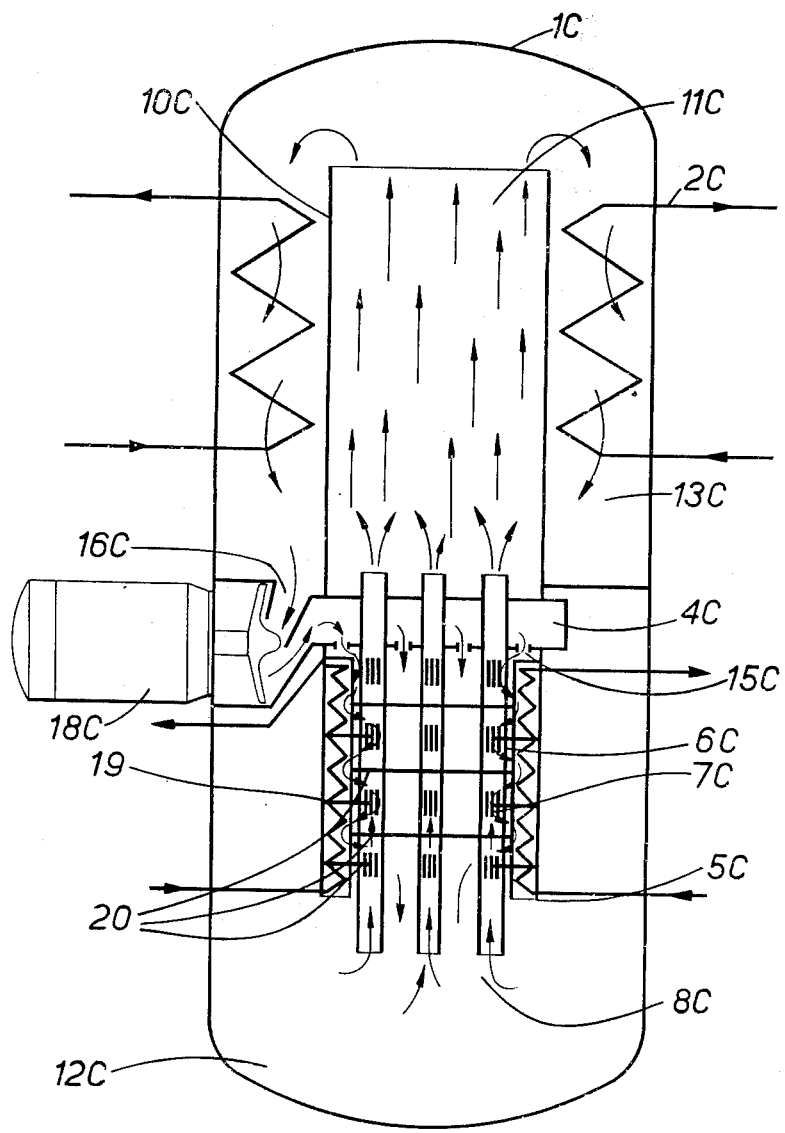
FIGURE 4 is a longitudinal sectional elevation of fourth embodiment.

FIGURE 4 shows a fourth embodiment of the invention. Parts of the reactor which are similar in shape, position and function to the corresponding parts of the reactor described with reference to FIGURE 3 are similarly numbered but suffixed C. Such parts will not again be described in detail.

Referring to FIGURE 4, a lower heat exchanger or series of heat exchangers 19 are mounted around the inside of the skirt 5C. A series of lower water baffles 20 are mounted around the fuel element channels 6C and the heat exchanger 19 in such fashion that any water passing donwwardly from openings 15C is constrained to follow a path passing alternately around the fuel channels 6C and around the heat exchanger 19. Thus in operation water coolant following such a path alternately gathers heat from the outer wall of the fuel channel 6C and surrenders some of that heat to the lower heat exchanger 19. The rate of coolant flow is so adjusted as to ensure that the sub-cooled condensate leaving chamber 4C is near or at saturation temperature by the time it reaches the region 8C as in other embodiments of the invention. The lower heat exchanger can form the economiser section of the heat exchanger 2C.

Although this embodiment is described with reference to a pump system similar to the third embodiment it is understood that a similar arrangement of the lower heat exchangers could be incorporated in embodiments of the first and second type also. The fuel 7 could be inside or outside the tubes in the embodiments of FIGURES 1, 2 and 3.

The reactors described above operate with a steam wetness at the outlet of channels 6 like that encountered in known boiling water reactors, for example 13% but, with the improved flux pattern which arises from a moderator free of boiling and boiling in the fuel channels more evenly distributed along the channels and greater temperature uniformity, a greater quantity of heat can be generated in each channel 6 and faster coolant flow rates can be accepted through the channels and hence a higher steam output for a given wetness at the outlet of the channels 6 is possible.

We claim:
1. In a method of operating a boiling water nuclear reactor of the type in which fuel elements are arranged in channels defining coolant flow paths, the steps of passing coolant water along the outside of the channels in heat transfer relationship therewith and then through the channels and over the fuel elements to effect boiling in the coolant water condensing at least a portion of the water coolant passing from the exit of said channels, mixing said condensed portion with the remaining portion of coolant water passing from the exit of said channels, passing the mixed portions of coolant water along the outside of the channels to continue the cycle, and regulating the relative sizes of said portions so as to have the mixture approximately at saturation temperature upon reaching the fuel elements in the channels.

2. A boiling water nuclear reactor comprising a pressure vessel; a vapor generator in said vessel; means defining channels have nuclear fuel elements therein; means defining coolant flow paths for directing coolant flow over said vapor generator, along the outside of said channels in heat exchange relationship therewith, counter-currently inside the channels and over the fuel elements therein, and back to said vapor generator; said coolant flowing over said fuel elements comprising a mixture of condensed coolant vapors from said vapor generator and unvaporized coolant from the exit of the channels; and means for regulating the conditions of the coolant so that the coolant will be approximately at saturation temperature when it reaches the fuel elements in the channels, said regulating means comprising means for varying the relative amounts of the components of the mixture.

References Cited by the Examiner

UNITED STATES PATENTS

| | | | |
|---|---|---|---|
| 3,042,595 | 7/1962 | Cobb et al. | 176—56 |
| 3,108,937 | 10/1963 | Kumpf et al. | 176—61 |

FOREIGN PATENTS

| | | |
|---|---|---|
| 1,265,483 | 5/1961 | France. |
| 1,279,117 | 11/1961 | France. |

OTHER REFERENCES

Lenz: German application No. 1,039,659, printed Sept. 25, 1958.

LEON D. ROSDOL, *Primary Examiner.*

REUBEN EPSTEIN, CARL D. QUARFORTH,
*Examiners.*

L. D. RUTLEDGE, *Assistant Examiner.*